United States Patent
Lin et al.

(10) Patent No.: US 8,611,273 B2
(45) Date of Patent: Dec. 17, 2013

(54) SYSTEM LEVEL ARCHITECTURES FOR RELAYED UPLINK COMMUNICATION

(75) Inventors: Zinan Lin, Melville, NY (US); Eldad M. Zeira, Huntington, NY (US); Alexander Reznik, Titusville, NJ (US); Prabhakar R. Chitrapu, Blue Bell, PA (US); Sana Sfar, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 363 days.

(21) Appl. No.: 12/499,284

(22) Filed: Jul. 8, 2009

(65) Prior Publication Data

US 2010/0008287 A1    Jan. 14, 2010

Related U.S. Application Data

(60) Provisional application No. 61/079,850, filed on Jul. 11, 2008.

(51) Int. Cl.
*H04B 7/212* (2006.01)

(52) U.S. Cl.
USPC ........... 370/321; 370/326; 370/337; 370/344; 370/348; 370/498

(58) Field of Classification Search
USPC ......... 370/319, 321, 322, 326, 336, 337, 344, 370/348
See application file for complete search history.

(56) References Cited

U.S. PATENT DOCUMENTS

| 2006/0193280 | A1 | 8/2006 | Lee et al. | |
|---|---|---|---|---|
| 2007/0086368 | A1* | 4/2007 | Lee et al. | 370/313 |
| 2007/0155315 | A1 | 7/2007 | Lee et al. | |
| 2008/0025251 | A1 | 1/2008 | Lee et al. | |
| 2008/0040648 | A1* | 2/2008 | Li et al. | 714/776 |
| 2008/0075044 | A1 | 3/2008 | Maher | |
| 2009/0313528 | A1* | 12/2009 | Chugg et al. | 714/758 |

FOREIGN PATENT DOCUMENTS

| EP | 1 729 435 | 12/2006 |
|---|---|---|
| EP | 1 770 879 | 4/2007 |
| EP | 1 848 165 | 10/2007 |
| WO | 2009/110628 | 9/2009 |

OTHER PUBLICATIONS

LAN/MAN Standards Committee of the IEEE Computer Society, "Part 16: Air Interface for Broadband Wireless Access Systems," 802.16j-2009 (Amendments to IEEE Std 802.16-2009) (Jun. 2009).

(Continued)

*Primary Examiner* — Alvin Zhu
(74) *Attorney, Agent, or Firm* — Volpe and Koenig, P.C.

(57) ABSTRACT

A wireless communication method and apparatus are disclosed for assigning different phases, (i.e., time periods), to perform data transmissions over designated frequency bands in a cooperative relaying system. In phase 1, a relay station (RS) listens to a wireless transmit/receive unit (WTRU) and successfully receives b information bits. In phase 2, the RS and WTRU cooperatively transmit these b information bits to the destination. These transmissions may be performed in a unicast scheme, wherein a WTRU sends information to a selected RS in phase 1, and the RS forwards the information to a base station (BS) in phase 2. The transmission may also be performed in a multicast scheme, wherein the WTRU sends information to the RS and the BS in phase 1, and the RS transmits a subset the information to the BS in phase 2.

5 Claims, 6 Drawing Sheets

(56) References Cited

OTHER PUBLICATIONS

LAN/MAN Standards Committee of the IEEE Computer Society, "Part 16: Air Interface for Fixed and Mobile Broadband Wireless Access Systems," 802.16m.09/0010r1a (working document) (Mar. 2008).

Kaneko et al., "Amplify-and-Forward Cooperative Diversity Schemes for Multi-Carrier Systems," IEEE Transactions on Wireless Communications, vol. 7, No. 5, pp. 1845-1850 (May 2008).

LAN/MAN Standards Committee of the IEEE Computer Society, "Part 16: Air Interface for Fixed and Mobile Broadband Wireless Access Systems," 802.16m-09/0010r1a (working document) (Mar. 2008).

LAN/MAN Standards Committee of the IEEE Computer Society, "Part 16: Air Interface for Broadband Wireless Access Systems," 802.16j-2009 (Amendment to IEEE Std 802.16-2009) (Jun. 2009).

Laneman et al., "Cooperative Diversity in Wireless Networks: Efficient Protocols and Outage Behavior," IEEE Transaction on Information Theory, vol. 50, Issue 12, pp. 3062-3080 (Dec. 2004).

Laneman et al., "Distributed Space-Time-Coded Protocols for Exploiting Cooperative Diversity in Wireless Networks," IEEE Transactions on Information Theory, vol. 49, No. 10, pp. 2415-2425 (Oct. 2003).

Nosratinia et al., "Cooperative Communication in Wireless Networks," Adaptive Antennas and MIMO Systems for Wireless Communications, IEEE Communications Magazine, vol. 42, Issue 10, pp. 74-80 (Oct. 2004).

Shin et al., "Design of an OFDM Cooperative Space-Time Diversity System," IEEE Transactions on Vehicular Technology, vol. 56, No. 4, pp. 2203-2215 (Jul. 2007).

Castura et al, "Rateless coding for wireless relay channels," IEEE Transactions on Wireless Communications, vol. 6, No. 5 (May 2007).

Castura et al, "Rateless Coding and Relay Networks," IEEE Signal Processing Magazine, pp. 27-35 (Sep. 2007).

* cited by examiner

SYSTEM LEVEL ARCHITECTURES FOR RELAYED UPLINK COMMUNICATION

CROSS REFERENCE TO RELATED APPLICATIONS

This application claims the benefit of U.S. Provisional Application No. 61/079,850 filed Jul. 11, 2008, which is incorporated by reference as if fully set forth.

FIELD OF INVENTION

This application is related to wireless communications.

BACKGROUND

System level architectures for relayed downlink (DL) communications have been widely studied where communication is configured in time division multiplexing (TDM) fashion. Data is transmitted to a wireless transmit/receive unit (WTRU) or a relay station (RS) in different time slots.

In a system including a WTRU and a RS that has a flat fading channel condition, various relaying schemes have been proposed for DL cellular communications, and simulations of high speed downlink packet access (HSDPA) have been performed. It has been shown that these proposed relaying schemes greatly boost a cell-edge WTRU's signal-to-interference and noise ratio (SINR) distribution, and extend the cell coverage. These schemes assume a two-hop communication, which consists of two phases. In phase 1 ($T_1$), a base station (BS) transmits a message, intended for a WTRU, to a selected RS, until the RS correctly decodes the message. After the RS succeeds in decoding a received message sent by a BS, the RS takes over the communication and forwards information needed for the WTRU to fully decode the message. This transmission may be performed with or without the cooperation of the BS.

Two main channel coding techniques have been proposed for these relaying schemes. A first main channel coding technique is conventional fixed-rate coding. A second main channel coding technique is rateless coding.

The basic concept of rateless coding is to encode an input message with an infinitely long block length. The (presumably infinite) output is then divided into an infinite stream of finite-sized messages which are then transmitted sequentially. A transmitter terminates the transmission of the rateless codeword only when it receives an acknowledgement (ACK) of successful decoding from a receiver. Note that no actual transmission is ever infinite, since a truly infinite code output cannot be generated in practice. Rather, either a new coded message is generated from the input "on the fly" (as needed), and/or a finite number of retransmissions is established as a system parameter. However, the actual rate of the rateless code is determined by the time when the receiver decodes the message correctly, and is not fixed. This enables a rateless code to adapt to whatever conditions a time-variable channel, (e.g., a fading channel), may present and effectively pick the correct coding rate for that channel. Alternatively, it is known that it is difficult for a fixed-rate coded system to do so without channel state information (CSI) being available in the transmitter. Furthermore, a fixed-rate coded system is forced to operate at low efficiency, (i.e., low rate), to combat channel variation and increase channel reliability. These factors alone suggest the application of rateless coding in a relaying system. However, a rateless coding paradigm is also a natural paradigm for distributing coding between multiple terminals, (WTRU and RS), and it is desired the terminals to transmit cooperatively with a minimal amount of synchronization.

In uplink (UL) communication, the network configuration and interference modeling may be the same as in DL communication. There may be one transmitter antenna and one receiver antenna each, in the WTRU, the RS, and the BS.

A number of RSs may be dedicated to assist one WTRU in each cell. The RS may be associated with a BS. The RSs may only assist one WTRU, which may be associated with the same cell and in communication with the associated BS.

There may be one WTRU per cell, and the number of RSs assisting the WTRU at one time slot may be limited to one.

Similar to DL, let b denote the total number of information bits that the WTRU has to deliver to the BS. In phase 1, the BS may not receive all b bits sent from the WTRU or may not receive any information bits at all. Let the subscript r denote transmissions to the relay, from the relay, or both. Let u denote transmissions from the WTRU. The rate from the WTRU to the RS in phase 1 is denoted $R_{r1}$. The rate from the RS to the BS is denoted $R_{r2}$. The rate from the WTRU to the BS in phase t is denoted as $R_{ut}$, where t∈{1, 2}. Let $P'_{rt}$ represent the average received power at the receiver of the transmission involving the RS in Phase t, and let $P'_{ut}$ represent the average received power at the BS sent from the WTRU in phase t. Let $g_{xt}$ and $I_{xt}$ represent the fading coefficient and inter-cell interference (ICI) which occurred in transmission x, in phase t. Let $\rho_{xt}$ denote the ICI power spectrum which occurred in transmission x, in phase t and let $\rho_0$ denote the noise power spectrum. Let $N_0$ denote the white noise power occupying the whole band.

In a unicast two-hop scheme, wherein the WTRU transmits to the RS, may be used. During phase 1, a WTRU sends information to a selected RS using up to the maximum rate supportable by the WTRU-RS link. Generally, the number of information bits sent to the RS is b. A split cooperative multiplexing scheme enables the WTRU to send $b_{RS}$ (a subset of b bits).

During phase 2 ($T_2$), for transmissions from the RS to the BS using forwarding, the RS takes over the transmission and forwards the information bits to the BS.

For transmissions from the RS and the WTRU to the BS using coherent cooperative diversity, CSI may be available at the transmitters. The transmitters may use the channel phase information feedback from the receiver to multiply their signals with a phase-weight, and enable their signals to add coherently at the receiver. The total number of bits cooperatively transmitted by the transmitters is b bits.

For transmissions from the RS and the WTRU to the BS using Alamouti cooperative diversity, an Alamouti transmission scheme may be enabled among the RS and the WTRU. The RS and the WTRU cooperatively transmit the b bits to the BS to achieve the best diversity and multiplexing trade-off.

For transmissions from the RS and the WTRU to the BS using a simple cooperative Multiplexing scheme, the RS and the WTRU act as two distributed antennas. The b bits of information are encoded by the WTRU and the RS independently to guarantee the per-link capacity, and transmitted to the BS.

For transmissions from the RS and the WTRU to the BS using a split cooperative multiplexing scheme, wherein $b=b_{RS}+b_{WTRU}$, the RS and the WTRU act as two distributed antennas. The WTRU pushes new information bits, $b_{WTRU}$, to the BS, and the RS transmits $b_{RS}$ bits to the BS. The RS and the WTRU use two different codewords to encode $b_{RS}$ and $b_{WTRU}$ information bits respectively. The per-link capacity is guaranteed by this transmission.

In a multicast two-hop scheme, wherein the WTRU transmits to the RS, the BS, or both, may be used. During phase 1, the WTRU sends information to the selected RS and BS with the maximum rates, (R_{r1} and R_{m1}, respectively), supportable by the respective WTRU-RS and WTRU-BS links. Generally, the number of information bits sent to the RS is b. A split cooperative multiplexing scheme enables the WTRU to send $b_{RS}$, (a subset of b bits). The WTRU-BS link may be worse than the WTRU-RS link. In this case, the RS may send an acknowledgement (ACK) before the BS does. During this period, the BS only decodes fractional information sent to the RS, (i.e., b1 bits, which is the subset of b or $b_{RS}$).

During phase 2, for transmissions from the RS to the BS using forwarding, the RS forwards the remaining b2 (where b2=b−b1) information bits, which have not been received by the BS.

For transmissions from the RS and the WTRU to the BS using coherent cooperative diversity, CSI may be available at the transmitters. The transmitters may use the channel phase information to multiply their signals with a phase-weight, and enable their signals to add coherently at the receiver. The total number of bits sent from the transmitters is b2 (where b2=b−b1) bits.

For transmissions from the RS and the WTRU to the BS using Alamouti cooperative diversity, the RS and the WTRU cooperatively transmit the remaining b2 bits to the BS with an Alamouti transmission scheme. By doing so, two levels of diversity can be obtained without losing any data rate.

For transmissions from the RS and the WTRU to the BS using a simple cooperative multiplexing scheme, the RS and the WTRU multiplex the remaining b2 bits with two different codewords and send those bits to BS.

For transmissions from the RS and the WTRU to the BS using a split cooperative multiplexing scheme, wherein $b=b_{RS}+b_{WTRU}$, the new information bits, $b_{WTRU}$, are pushed from the WTRU to the BS directly. The RS and the WTRU act as two distributed antennas and use two different codewords to encode $b_{RS}$ and $b_{WTRU}$ bits respectively. The per-link capacity is guaranteed by this transmission.

A quasi-static flat fading channel may be considered. Due to the protocol symmetry of one WTRU-one RS-one BS communications in DL and UL, the relaying schemes for DL one WTRU-one RS communication can be applied in UL one WTRU-one RS communication, as discussed above.

The respective rates for each link in different transmission phases can be similarly derived.

Cell-edge WTRUs obtain more benefits from relaying communications than cell-center WTRUs. Therefore, similar to DL communications, cell-edge WTRUs usually seek RS help to increase channel link reliability. Unlike DL communication, the first hop communication in UL relaying systems experiences more ICI than the second hop. This is due to the geometry of the cell-edge WTRUs. Therefore, the ICI impact on the overall performance of UL relaying systems may be different from the DL relaying systems.

Consideration may be given to WTRU and BS locations, and how to pick up the available RS such that the throughput for a given scheme is maximized.

Figures 1, 2, 3:
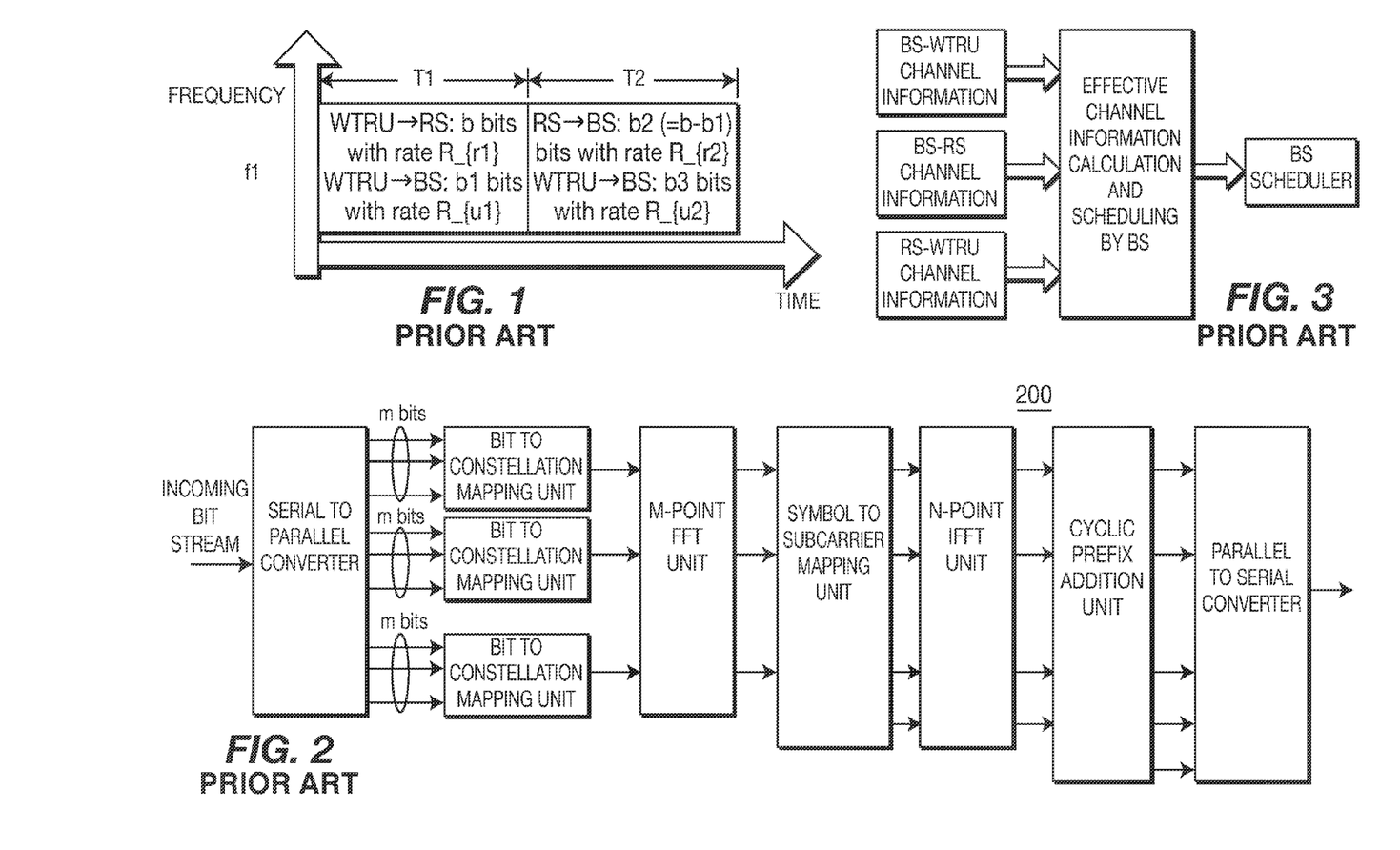
FIG. 1 shows a conventional multicast split cooperative multiplexing scheme.
FIG. 2 shows a block diagram of a conventional SC-FDMA transmitter.
FIG. 3 shows a conventional centralized multicarrier implementation.

Consideration is given to the best relay location, which provides the largest throughput for UL communications. Multicast split cooperative multiplexing schemes may provide the best performance among the DL relaying schemes, without requiring CSI at the transmitter. The corresponding scheme for UL is illustrated in FIG. 1.

The effective rate for the multicast split cooperative multiplexing scheme is expressed as:

$$R_{Multicast\_Split\_Coop\_Mux} = \frac{b + b_3}{T_1 + T_2} \quad \text{Equation (1)}$$
$$= \frac{R_{r1}(R_{r2} + R_{u2}) - R_{u2}R_{u1}}{R_{r2} + R_{r1} - R_{u1}},$$

where $$R_{r1} = W_1 \log\left(1 + \frac{g_{r1}^2 P'_{r1}}{N_0 + I_{r1}}\right), \quad \text{Equation (2)}$$

$$R_{u1} = W_1 \log\left(1 + \frac{g_{u1}^2 P'_{u1}}{N_0 + I_{u1}}\right), \quad \text{Equation (3)}$$

$$R_{r2} = W_1 \log\left(1 + \frac{g_{r2}^2 P'_{r2}}{N_0 + I_{r2}}\right), \quad \text{Equation (4)}$$

and $$R_{u2} = W_1 \log\left(1 + \frac{g_{u2}^2 P'_{r2}}{N_0 + g_{r2}^2 P'_{r2} + I_{u2}}\right). \quad \text{Equation (5)}$$

If service implementation capabilities (SIC) are implemented in the receiver of the BS, the interference from the weaker link (WTRU-BS) may be cancelled in the reception of the stronger link (RS-BS).

The upper bound of Equation (1) may be achieved when $R_{r1}=R_{r2}$ as:

$$R_{Multicast\_Split\_Coop\_Mux} = \frac{R_{r1}R_{r2} + R_{u2}R_{r1} - R_{u1}R_{u2}}{R_{r1} + R_{r2} - R_{u1}} \leq \quad \text{Equation (6)}$$

$$\frac{R_{r1}R_{r2} + R_{u2}R_{r1} - R_{u1}R_{u2}}{2\sqrt{R_{r1}R_{r2}} - R_{u1}} \stackrel{R_{r1}=R_{r2}}{=}$$

$$\frac{R_{r1}R_{r2} + R_{u2}R_{r1} - R_{u1}R_{u2}}{2R_{r1} - R_{u1}} \stackrel{R_{u1}<R_{r1}}{<}$$

$$R_{r2} + R_{u2} - \frac{R_{u1}R_{u2}}{R_{r1}}.$$

Therefore, to achieve the maximum rate of Equation (1), given a distance between the WTRU and the BS, the RS should be selected as $R_{r1}=R_{r2}$. Cell-edge WTRUs obtain more benefits from communicating through the RS than cell-center WTRUs. Considering cell-edge WTRUs, two-hop transmissions experience more ICI in the first hop than the second hop. For a fixed WTRU-BS distance, the RS closer to the WTRU provides higher throughput than the RS closer to the BS.

Re-organizing the upper-bound of Equation (6):

$$R_{Multicast\_Split\_Coop\_Mux} < \underbrace{R_{r2} + R_{u2}}_{S1} - \underbrace{\frac{\frac{b}{R_{r1}}R_{u1}}{\frac{b}{R_{u2}}}}_{S2}. \quad \text{Equation (7)}$$

Multicast split cooperative multiplexing schemes approach the rate which is expressed as the difference between S1 and S2. S1 represents the rate of a 2×1 multiple-input multiple-output (MIMO) scheme, meaning that the RS and the WTRU simultaneously transmit two independent data streams to the BS with different codewords. S2 represents the corresponding rate, which is calculated by dividing the number of bits received by the BS in phase 1, by in the time required for the transmission, where the bits received at the RS were re-transmitted from the WTRU in phase 2. Therefore, the rate upper bound of the split cooperative multiplexing scheme is equivalent to the rate achieved by the distributed 2×1 MIMO scheme with the transmission of b bits, subtracting the rate of the transmission of a subset of b bits received by the BS in phase 1 and redundantly transmitted by the WTRU in phase 2.

One way to increase the overall transmission bandwidth, without suffering from increased signal corruption due to radio-channel frequency selectivity, may be the use of multi-carrier transmissions. In multicarrier transmissions, instead of transmitting a wider-band signal, multiple, more narrow-band signals, which are referred to as subcarriers, are frequency multiplexed and jointly transmitted to the same receiver over the same radio link.

To reduce large variations in the instantaneous power of the transmitted power at the WTRU, single carrier frequency division multiple access (SC-FDMA) may be adopted as a long term evolution (LTE) UL communication techniques. An exemplary diagram of an SC-FDMA transmitter 200 is shown in FIG. 2. The main difference between SC-FDMA and orthogonal frequency division multiple access (OFDMA) is that, before feeding into an inverse discrete Fourier transform (IDFT) modulation with a larger number of subcarriers, the signals are discrete Fourier transform (DFT) spread with a smaller number of points. Therefore, SC-FDMA may also be called DFT-spread orthogonal frequency division multiplexing. This scheme decreases variations in the instantaneous power of the transmitted signal, (single-carrier property), but keeps the orthogonal property of subcarriers to combat frequency selectivity and provide the flexibility of bandwidth assignment in FDMA communications.

Consideration is given to using relaying in multicarrier systems to improve the WTRU's signal-to-interference plus noise ratio (SINR) distribution, and further exploitation of frequency diversity in cooperative relaying schemes.

Consideration is given to implementation of relaying schemes in multicarrier communication systems. Due to frequency selectivity, different subcarriers have different fading coefficients. To maximize throughput, it is possible to use relaying for some subcarriers for a given WTRU. For example, relaying may be used for subcarriers which are in a very bad situation, (e.g., those who suffer from high fading coefficients), and direct transmission may be performed for the subcarriers which are in good enough situations. Thus, the RS may help those subcarriers which experience a bad WTRU-BS link. The BS may make per-subcarrier based decisions for the WTRU. These decisions may be based on the effective channel information computed from the channel information of the WTRU and the RS. The BS may schedule subcarriers to different WTRUs, and the BS may decide which subcarrier should be used for a certain WTRU's direct transmission or cooperative transmission through the RS.

An illustrative example of this procedure is given in FIG. 3. The BS scheduling information may be carried on the control channel sent to the WTRU. In a multicarrier cooperative scheme, carriers may be partitioned into two groups: f1, to be used for direct (one-hop) transmission, and f2, to be used for cooperative (two-hop) transmission. The groups f1 and f2 may be treated disjointly. In this case, all the DL cooperative schemes described above may be used for cooperative communication on f2 group carriers. To maximize throughput, it may be required that the BS have feedback for every channel quality, so that f1 and f2 are partitioned well for every assigned WTRU. Therefore, the overhead may be large.

The relay schemes discussed above may be applied in the subcarriers which assigned to two-hop transmission. The BS scheduling and decision can be per-subcarrier based, per-radio bearer (RB) based, (wherein one RB contains continuous subcarriers and each RB is considered to have a flat fading channel), per-subband based, (wherein one subband consists of consecutive RBs, and each subband is considered to have a flat fading channel), or another basis, as long as the unit is considered as having a flat fading channel.

In particular, a relay system implemented with rateless coding may achieve rates approaching theoretical limits without the requirement of CSI at the transmitter. The relay system may also increase the robustness of the variations of channel statistics. System-level simulation results show that a multicast relaying system with rateless coding may provide up to 20% gains over conventional coded relaying systems in terms of cell throughput. Furthermore, compared with conventionally coded relaying systems, less overhead is required between the WTRU, RS, and BS in a rateless coded system. This is advantageous for practical implementation.

It is desirable to achieve similar advantages in UL communications. Therefore, several options are considered for system level architecture for relayed UL communications assuming TDM operation in the RS, where the reception and transmission of the RS cannot be preformed at the same time slot.

SUMMARY

A wireless communication method and apparatus are disclosed for assigning different phases, (i.e., time periods), to perform data transmissions over designated frequency bands in a cooperative relaying system. In phase 1, the RS listens to the WTRU and successfully receives b information bits. In phase 2, the RS and WTRU cooperatively transmit these b information bits to the destination. These transmissions may be performed in a unicast scheme, wherein the WTRU sends information to the selected RS in phase 1, and the RS forwards the information to the BS in phase 2. The transmission may also be performed in a multicast scheme, wherein the WTRU sends information to the RS and the BS in the phase 1, and the RS transmits a subset the information to the BS in phase 2. Multiple cooperative schemes may be used, including RS to BS forwarding, coherent cooperative diversity, Alamouti cooperative diversity, simple cooperative multiplexing, and split cooperative multiplexing.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "base station" includes but is not limited to a Node-B, a site controller, an access point (AP), or any other type of interfacing device capable of operating in a wireless environment.

Layered Multicarrier Implementation

In contrast to the conventional schemes discussed above, the RS may act as a small BS to save on signaling overhead sent to the BS. No channel information between the WTRU and the RS is required at the BS. The BS may assign frequency bands to the WTRUs and notice them its corresponding RSs if they need help, based on the channel information from the WTRU only. The selected RS may use the channel information (WTRU-BS and WTRU-RS) reported from the assigned WTRU to determine which bands are used for either the transmission from the WTRU to the RS or the transmission from the WTRU to the BS. An illustrative example of this procedure is given in FIG. 4.

Multicarrier Cooperative Schemes

As an alternative to the conventional multicarrier cooperative scheme illustrated by FIG. 3, the groups f1 and f2 may be treated jointly for conducting both direct one-hop and cooperative two-hop communications. To simplify the implementation, the BS may conduct scheduling of direct transmissions, in order to schedule a certain number of carriers to different WTRUs. The RS may then divide the assigned carriers into two groups and determine which group of the carriers is used for direct transmission and which group is used for cooperative transmission. Due to the relative static conditions between the BS and the RS, the BS may schedule the carriers to the WTRU at a slower rate than the RS does. Therefore, the overhead feedback to the BS may become less, and the processing and signaling burden put on the BS may be alleviated. Thus, the work is transferred from the BS to the RS, and more of the overhead consists of feedback to the RS. An illustrative example implementation is given in FIG. 4.

Figure 4:
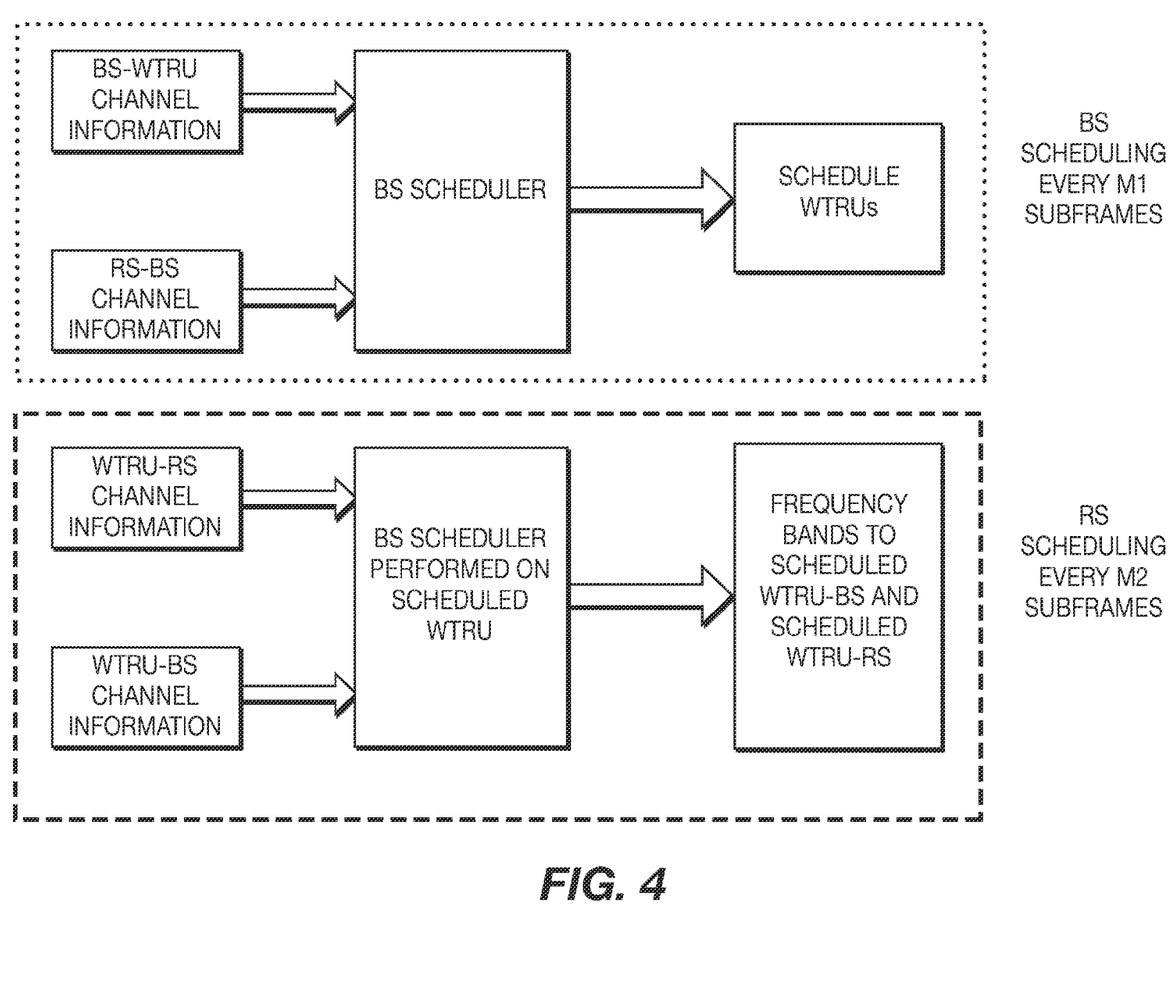
FIG. 4 shows a layered multicarrier implementation in an RS and a BS.

Various cooperative schemes using the implementation of FIG. 4 are considered below.

It may be assumed that the frequency band (W) assigned for transmission between the WTRU and the BS, is $W_1$ and $W_2$, wherein $W_1$ may be used for transmission from the WTRU to the BS (one-hop transmission) and $W_2$ may be used for transmission from the WTRU to the RS (two-hop transmission). In more general context, the WTRU may use a different number of subcarriers to transmit the data to different receivers, the RS and the BS. The subcarriers assigned to these two transmissions are not necessarily continuous.

A transmission may consist of two phases. In phase 1, the WTRU transmits to the selected RS in $W_2$ until the RS fully decodes the original message which is intended to WTRU. Meanwhile, the WTRU transmits some bits to the BS directly in $W_1$ if there are some subcarriers between the WTRU and the BS that are better than those between the WTRU and the RS. In phase 2, the RS takes over the transmission and sends the information that the BS needs to recover the message with multiplexing, without multiplexing or both, and with cooperation with the WTRU, without cooperation with the WTRU, or both, or any combination thereof.

Single Transmission from the WTRU

The bits sent to the BS directly in phase 1 may be transmitted to the RS as well. All of the information intended to the BS may be passed through the RS. During this transmission the BS may get a subset of the information from WTRU. The basic concept behind this type of scheme is that there is only one single data stream coming from WTRU. The common procedures of these schemes are given as follows.

The WTRU transmits b information bits to the RS and the BS at the same time, but in different frequencies, the RS may get the packet correctly before the BS does. After the RS gets the signal successfully from the WTRU, the RS sends an ACK to the WTRU. At this moment, the BS has obtained b1 bits correctly from the WTRU's direct transmission. Three options for transmitting the remaining b2 bits are listed below.

Forwarding Relay

Figures 5, 7:
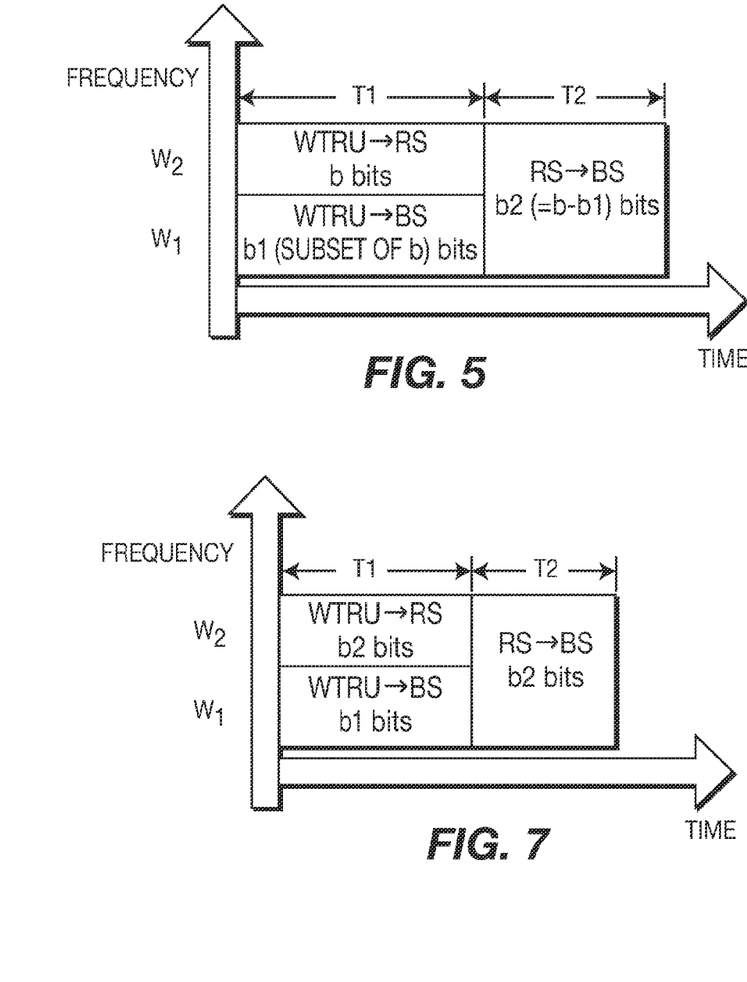
FIG. 5 shows relay forwarding with a single data stream.
FIG. 7 shows forwarding relaying with multiple streams from the WTRU.

The WTRU stops transmission in $W_1$ and the RS forwards b2 bits to the BS using W (wherein $W=W_1+W_2$) until it receives an ACK from the BS. An illustrative example is shown in FIG. 5.

This option has the advantage of power saving in the WTRU, because the WTRU only transmits its packet after the RS receives successfully. Another advantage is that less signaling is required in the WTRU, such as the ACK from the RS to the WTRU and the ACK from the BS to the RS.

This option has the disadvantage that the BS needs to be informed that the transmission is coming from the RS after the RS sends the ACK back to the WTRU.

This option is characterized by an effective rate as follows:

$$T_1 = \frac{b}{R_{r1}}, \qquad \text{Equation (8)}$$

$$T_2 = \frac{b - R_{r1} T_1}{R_{r2}}, \qquad \text{Equation (9)}$$

$$TP_{\text{eff}} = \frac{b}{T_1 + T_2} = \frac{R_{r1} R_{r2}}{R_{r1} + R_{r1} - R_{u1}}, \qquad \text{Equation (10)}$$

where $$R_{r1} = W_2 \log_2\left(1 + \frac{\frac{W_2}{W} g_{r1}^2 P'_{r1}}{W_2 \rho_0 + \rho_{r1} W_2}\right), \qquad \text{Equation (11)}$$

$$R_{u1} = W_1 \log_2\left(1 + \frac{\frac{W_1}{W} g_{u1}^2 P'_{u1}}{\rho_0 W_1 + \rho_{u1} W_1}\right), \qquad \text{Equation (12)}$$

and $$R_{RS-BS} = W \log_2\left(1 + \frac{g_{r2}^2 P'_{r2}}{W \rho_0 + W \rho_{r2}}\right). \qquad \text{Equation (13)}$$

Cooperative Relay

Figures 6, 8:
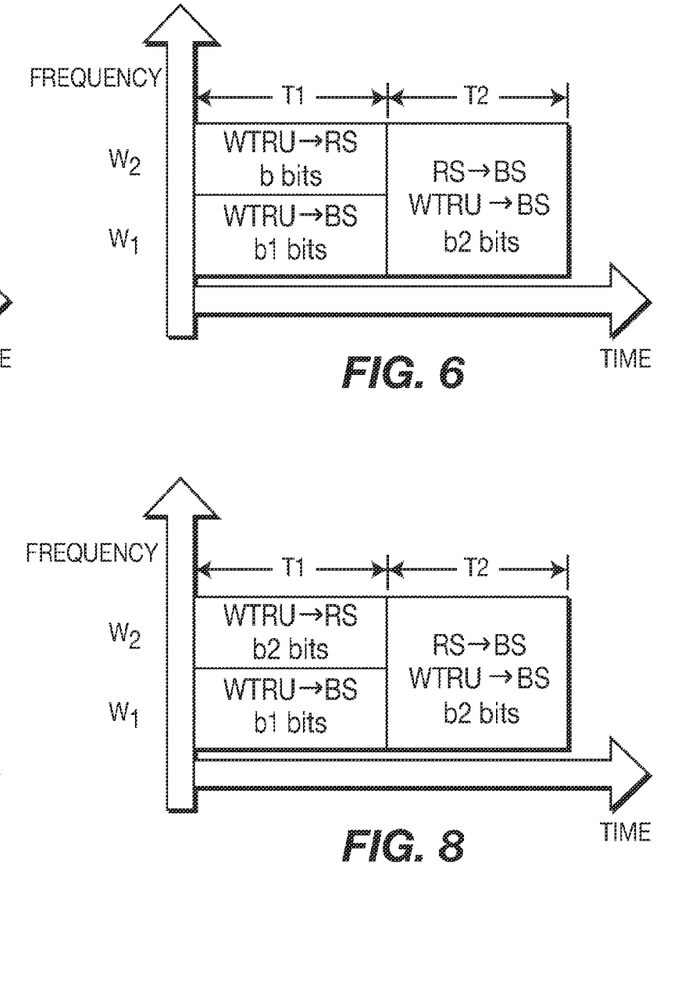
FIG. 6 shows cooperative relaying with a single stream from a WTRU.
FIG. 8 shows cooperative relaying with multiple streams from the WTRU.

The WTRU does not stop transmission in $W_2$. The WTRU and the RS coordinately transmit b2 bits to the BS in W (wherein $W=W_1+W_2$) using either a predetermined distributed MIMO mode or a predetermined cooperative diversity mode. An example of this is shown in FIG. 6. One skilled in the art will recognize that predetermined means that no signaling is required between the RS and the WTRU regarding how distribution or cooperative diversity is performed, and that the mode is predefined, (for example, in the RS).

This option has the advantage that it may require a shorter time for successful transmission, which may result in a higher effective rate when compared with forwarding relay.

This option has the disadvantage of higher power consumption in the WTRU compared with forwarding relay. Also, more signaling is required, such as an ACK from the RS to the WTRU, synchronization between the RS and the WTRU, and an ACK from the BS to the RS and the WTRU. Furthermore, the BS needs to be informed about the transmission mode and that the transmission is coming from the WTRU and the RS.

This option is characterized by an effective rate as follows.

For cooperative spatial diversity, in phase 2, the RS and the WTRU cooperatively transmit the same bits (b2 bits) to the BS using, for example, Alamouti, (where no CSI is available at the transmitter), or coherent combining, (where CSI is available at the transmitter), such that the increased diversity levels strengthens the reliability of the communication of the b2 bits.

For cooperative frequency diversity, the RS and the WTRU transmit the same information bits, b2 bits, over $W_1$ and $W_2$ in parallel, for example, distributed space-frequency block code (SFBC).

For cooperative multiplexing, in phase 2, the RS and the WTRU independently transmit different bits to the BS over the same bandwidth and the total number of bits transmitted by the RS and the WTRU is b2. So, $$T_1 = \frac{b}{R_{r1}}, \quad \text{Equation (14)}$$

$$T_2 = \frac{b - b_1}{R_{u2} + R_{r2}}, \quad \text{Equation (15)}$$

$$b_1 = T_1 R_{u1}, \quad \text{Equation (16)}$$

and $$R_{eff}(\text{simple\_coop\_mux\_singlestream}) = \frac{b}{T_1 + T_2} = \frac{R_{r1}(R_{u2} + R_{r2})}{R_{u2} + R_{r2} + R_{r1} - R_{u1}}. \quad \text{Equation (17)}$$

Multiple Streams from the WTRU

Several schemes have been considered to describe how the RS may be used in wideband to help the WTRU transmit information to the BS. Examples of this are shown in FIGS. 7 and 8. In those schemes, before the RS starts to relay the information to the BS, (defined as phase 1), only an ACK is required to be sent from the RS to the WTRU after the RS succeeds in receiving all the bits from the WTRU. This scheme reduces the signaling overhead. However, the WTRU only sends a single data stream to the RS, some of which is redundant, as the BS has received some bits from the WTRU in phase 1. In contrast with DL communications, power consumption of WTRU is a serious concern in UL. In order to reduce the power consumption of the WTRU, it may be more efficient to avoid transmitting those bits to the RS which have been sent by the WTRU to the BS in phase 1. Therefore, several schemes in which the WTRU transmits different data streams to the RS and the BS respectively and in which the RS only receives the bits from the WTRU which have not been sent to the BS directly in phase 1, are considered. In these schemes, bandwidth allocation may be required before the transmission takes place.

These schemes include:

1) The WTRU transmits independent b1 information bits and b2 information bits to the BS and the RS in $W_1$ and $W_2$ respectively.

2) Proper design of bits allocation, bandwidth allocation, or both, between transmissions between the WTRU and the RS and between the WTRU and the BS, such that the BS and the RS successfully detect their bits at the same time.

3) After the RS gets b2 bits successfully, similar to the methods discussed above, there are three options for transmitting b2 bits from the RS to the BS. In cooperative Alamouti, in phase 2, the RS and the WTRU cooperatively transmit the same bits (b2 bits) to the BS with using space-time coding scheme, for example, Alamouti space-time block code (STBC) (without CSI at the transmitters) or coherent combination (with CSI at the transmitters). In distributed frequency diversity, in phase 2, the RS and the WTRU cooperative transmit the same b2 bits to the BS using different subcarriers, for example, SFBC. In cooperative multiplexing, in phase 2, the RS and the WTRU independently transmit different bits to the BS and the total number of bits transmitted by the RS and WTRU is b2. The effective rate may be expressed as, $$T_1 = \frac{b_2}{R_{r1}} = \frac{b_1}{R_{u1}}, \quad \text{Equation (18)}$$

$$T_2 = \frac{b_2}{R_{u2} + R_{r2}}. \quad \text{Equation (19)}$$

Therefore:

$$b_1 = T_1 R_{u1} = \frac{b_2}{R_{r1}} R_{u1}; \quad \text{Equation (20)}$$

and $$R_{eff}(\text{simple\_coop\_mux}) = \frac{b_1 + b_2}{T_1 + T_2} = \frac{(R_{u1} + R_{r1})(R_{r2} + R_{u2})}{R_{r2} + R_{u2} + R_{r1}}. \quad \text{Equation (21)}$$

Split Cooperative MIMO

Figure 9:
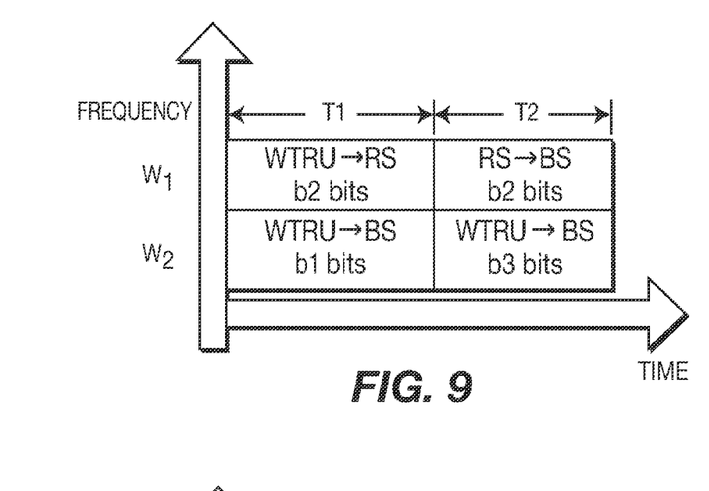
FIG. 9 shows split cooperative MIMO with multiple streams from the WTRU.

In phase 1, the WTRU transmits b2 bits to the RS and b1 bits to the BS in frequencies, $W_1$ and $W_2$ respectively. An example of this is shown in FIG. 9. The number of bits assigned between the transmissions of WTRU-RS and WTRU-BS depends on the bandwidth allocations in these two transmission and the link qualities of the WTRU-BS link and the WTRU-RS link. In phase 2, the RS and the WTRU act as distributed antennas, transmitting independent b2 and b3 bits to the BS.

This option is characterized by an effective rate as follows:

$$T_1 = \frac{b_2}{R_{r1}} = \frac{b_1}{R_{u1}}, \quad \text{Equation (22)}$$

$$T_2 = \frac{b_2}{R_{r2}} = \frac{b_3}{R_{u2}}, \quad \text{Equation (23)}$$

-continued $$R_{\textit{effect}}(\text{split\_coop\_mux\_singlestreams}) = \frac{b_1 + b_2 + b_3}{T_1 + T_2} = \frac{R_{u1}R_{r2} + R_{r1}R_{r2} + R_{u2}R_{r1}}{R_{r1} + R_{r2}}, \quad \text{Equation (24)}$$

where $$R_{u1} = W_1 \log\left(1 + \frac{\frac{W_1}{W} g_{u1}^2 P'_{u1}}{W_1(\rho_0 + \rho_{u1})}\right), \quad \text{Equation (25)}$$

$$R_{r1} = W_2 \log\left(1 + \frac{\frac{W_2}{W} g_{r1}^2 P'_{r1}}{W_2(\rho_0 + \rho_{r1})}\right), \quad \text{Equation (26)}$$

$$R_{U2} = W_1 \log\left(1 + \frac{g_{u2}^2 P'_{u2}}{N_0 + P'_{r2} + Int_{WTRU_1}}\right), \quad \text{Equation (27)}$$

and $$R_{r2} = W_1 \log\left(1 + \frac{g_{r2}^2 P'_{r2}}{N_0 + Int_{r2}}\right). \quad \text{Equation (28)}$$

When $R_{r1} = R_{r2}$, the upper bound of $R_{\textit{effect}}(\text{split\_coop\_mux\_multiplestreams})$ can be achieved as, $$R_{\textit{effect}}(\text{split\_coop\_mux\_multistreams})_{upper-bound} = \quad \text{Equation (29)}$$

$$\frac{1}{2}R_{r1} + \frac{1}{2}(R_{u1} + R_{u2}).$$

To maximize the rate, the following conclusions can be drawn.

Given a cell-edge WTRU's location, (a fixed distance between the WTRU and the BS), as the cell-edge users experience more ICI than the RS, a RS which is closer to the WTRU (than it is to the BS) provides a higher rate than a RS which is closer to the BS.

Assigning a certain amount of bandwidth to the transmission between the WTRU and the BS results in a higher rate than assigning no bandwidth to this transmission. Thus, it is better to let the WTRU directly transmit some bits to the BS rather than asking for the RS to forward all the bits to the BS. Furthermore, as the link between the RS and the BS is better than the one between the WTRU and the BS, $R_{r1}$ is higher than $R_1$. Hence, assigning more bandwidth to the transmission between the WTRU and the RS, (where the RS has a better link), than to the transmission between the WTRU and the BS, (where the BS has a worse link), results in a higher rate.

Adaptive FDMA Transmission

Figures 10, 12:
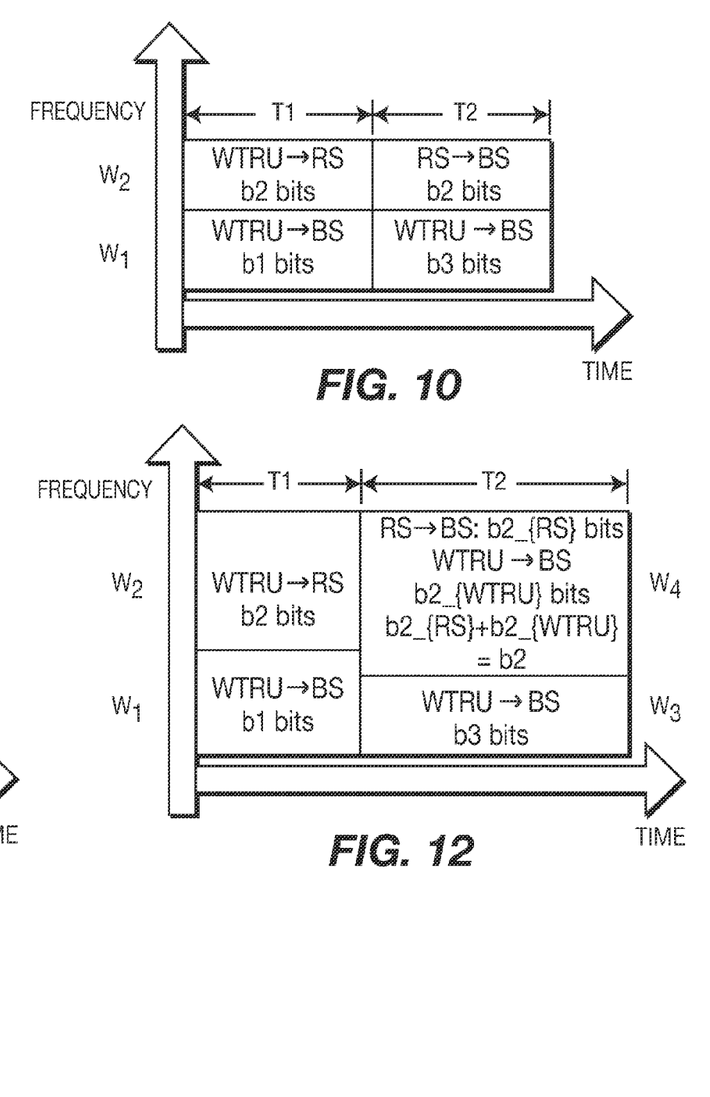
FIG. 10 shows forwarding relaying with adaptive FDMA.
FIG. 12 shows simple cooperative MIMO with adaptive FDMA.

Given the carriers assigned to a WTRU, the carriers are divided into a two-hop transmission group and a one-hop transmission group. An example of this is shown in FIG. 10. The carriers used for two-hop transmissions may be changed dynamically during the two phases in order to maximize throughput. Thus, the number of subcarriers assigned to the two-hop transmission group in phase 1 may be different from the number of subcarriers assigned in phase 2. Hence, the subcarriers assigned to direct transmission may be adaptively changed according to the carrier changes of the two-hop transmissions.

In phase 1, the WTRU transmits b2 bits to the RS and b1 bits to the BS in frequencies, $W_1$ and $W_2$ respectively. The number of bits assigned between the transmissions of WTRU-RS and WTRU-BS depends on the bandwidth allocations in these two transmission and the link qualities of the WTRU-BS link and the WTRU-RS link. In phase 2, the RS forwards b2 bits to the BS in frequency, $W_2'$. During this period (T2), the WTRU transmits new information bits, b3, to the BS in frequency, $W_1'$.

This option is characterized by an effective rate as follows:

$$T_1 = \frac{b_2}{R_{r1}} = \frac{b_1}{R_{u1}}, \quad \text{Equation (30)}$$

$$T_2 = \frac{b_2}{R_{r2}} = \frac{b_3}{R_{u2}}, \quad \text{Equation (31)}$$

$$R_{\textit{effect}}(\text{forwarding\_adaptiveFDMA}) = \quad \text{Equation (32)}$$

$$\frac{b_1 + b_2 + b_3}{T_1 + T_2} = \frac{R_{r1}R_{r2} + R_{u2}R_{r1} + R_{u1}R_{r2}}{R_{r1} + R_{r2}},$$

where $$R_{u1} = W_1 \log\left(1 + \frac{\frac{W_1}{W} g_{u1}^2 P'_1}{W_1(\rho_0 + \rho_{u1})}\right), \quad \text{Equation (33)}$$

$$R_{r1} = W_2 \log\left(1 + \frac{\frac{W_2}{W} g_{r1}^2 P'_{r1}}{W_2(\rho_0 + \rho_{r1})}\right), \quad \text{Equation (34)}$$

$$R_{u2} = W_1' \log\left(1 + \frac{\frac{W_1'}{W} g_{u2}^2 P'_{u2}}{W_1'(\rho_0 + \rho_{u2})}\right), \quad \text{Equation (35)}$$

$$R_{r2} = W_2' \log\left(1 + \frac{\frac{W_2'}{W} g_{r2}^2 P'_{r2}}{W_2'(\rho_0 + \rho_{r2})}\right), \quad \text{Equation (36)}$$

and $$W_1 + W_2 = W_1' + W_2' = W. \quad \text{Equation (37)}$$

$$R_{\textit{effect}}(\text{forwarding\_adaptiveFDMA}) = \quad \text{Equation (38)}$$

$$\frac{R_{r1}R_{r2} + R_{u2}R_{r1} + R_{u1}R_{r2}}{R_{r1} + R_{r2}} \leq \frac{R_{r1}R_{r2} + R_{u2}R_{r1} + R_{u1}R_{r2}}{2\sqrt{R_{r1}R_{r2}}} \Rightarrow$$

$$R_{\textit{effect}}(\text{forwarding\_adaptiveFDMA}) \leq$$

$$\frac{1}{2}\sqrt{R_{r1}R_{r2}} + \frac{1}{2}R_{u2}\sqrt{\frac{R_{r1}}{R_{r2}}} + \frac{1}{2}R_{u1}\sqrt{\frac{R_{r2}}{R_{r1}}}$$

where $R_{r1} = R_{r2}$, the upper bound of $R_{\textit{effect}}(\text{forwarding\_adaptiveFDMA})$ can be achieved as, $$R_{\textit{effect}}(\text{forwarding\_adaptiveFDMA})_{upper-bound} = \quad \text{Equation (39)}$$

$$\frac{1}{2}R_{r1} + \frac{1}{2}(R_{u1} + R_{u2})$$

To optimize the effective rate $R_{\textit{effect}}$ (forwarding_adaptive FDMA), the bandwidth assignment for the transmissions of WTRU-BS and WTRU-RS in phase 1 may be different from that of WTRU-BS and RS-BS in phase 2. The bandwidth allocations in the two phases are independent. Therefore, the optimum $W_1$ (or $W_2$) and $W_2$ (or $W_1$) can be found individually. Without loss of generality, the transmitted powers from the WTRU and the RS are denoted as $P_{WTRU}$ and $P_{RS}$ respectively. In phase 1, $W_1$ and $W_2$ may be allocated to maximize the effective rate $R_{\textit{effect}}$(forwarding_adaptive FDMA). By definition $R_{T_2} = R_{r2} + R_2$ and $R_{T_1} = R_{r1} + R_1$.

Therefore, $$\frac{\partial^2 R_{\text{effect}}(\text{forwarding\_adaptiveFDMA})}{\partial W_2^2} < 0 \qquad \text{Equation (40)}$$

$$\frac{\partial R_{\text{effect}}(\text{forwarding\_adaptiveFDMA})}{\partial W_2} = \qquad \text{Equation (41)}$$

$$\frac{\frac{\partial R_{r1}}{\partial W_2}R_{r2}(R_{T2} - R_1) + \frac{\partial R_1}{\partial W_2}R_{r2}(R_{r2} + R_{r1})}{(R_{r1} + R_{r2})^2}.$$

Therefore, to find the optimum $W_2$ such that $R_{\text{effect}}$ (forwarding_adaptive FDMA) is maximized, $$\frac{\partial R_{\text{effect}}(\text{forwarding\_adaptiveFDMA})}{\partial W_2} = \qquad \text{Equation (42)}$$

$$0 \Rightarrow \frac{\partial R_{r1}}{\partial W_2}(R_{T2} - R_1) + \frac{\partial R_1}{\partial W_2}(R_{r2} + R_{r1}) =$$

$$0 \Rightarrow \frac{\frac{\partial R_{r1}}{\partial W_2}}{\frac{\partial R_1}{\partial W_1}} = \frac{R_{r2} + R_{r1}}{R_{T2} - R_1} = \frac{R_{r2} + R_{r1}}{R_{r2} + R_2 - R_1}$$

Making use of the condition that $R_{r1} = R_{r2}$, it can be obtained that, $$\frac{\frac{\partial R_{r1}}{\partial W_2}}{\frac{\partial R_1}{\partial W_1}} = \frac{2R_{r1}}{R_{r2} + R_2 - R_1} \xrightarrow{R_2 \cong R_1} \frac{\frac{\partial R_{r1}}{\partial W_2}}{\frac{\partial R_1}{\partial W_1}} \approx 2. \qquad \text{Equation (43)}$$

Similarly, to maximize $R_{\text{effect}}$(forwarding_adaptive FDMA), $$\frac{\frac{\partial R_{r2}}{\partial W_2'}}{\frac{\partial R_1}{\partial W_1'}} = \frac{R_{r1} + R_{r2}}{R_{r1} + R_1 - R_2} \xrightarrow[R_{r1} = R_{r2}]{R_2 \cong R_1} \frac{\frac{\partial R_{r2}}{\partial W_2'}}{\frac{\partial R_1}{\partial W_1'}} \approx 2. \qquad \text{Equation (44)}$$

Satisfying the conditions of $R_{r1} = R_{r2}$, Equation (43) and Equation (44) make the effective rate of the scheme partial forwarding with media control (MC), $R_{\text{effect}}$(forwarding_adaptiveFDMA) reach the maximum rate. Therefore, based on the derived conditions, $R_{WTRU-RS} = R_{RS-BS}$ implies that, given a cell-edge WTRU's location (a fixed distance between the WTRU and the BS), as the cell-edge users experience more ICI than the RS, an RS which is closer to the WTRU than BS provides a higher rate than the RS which is closer to BS.

Furthermore, Equation (44) implies that assigning a certain amount of bandwidth to the transmission between the WTRU and the BS results in a higher rate than assigning no bandwidth to this transmission. In other words, letting the WTRU directly transmit some bits to the BS achieves a higher effective rate than asking the RS to forward all the bits to the BS. Furthermore, because the link between the RS and the BS is better than the one between the WTRU and the BS, $R_{r1}$ is higher than $R_1$. Therefore, Equation (44) also implies that assigning more bandwidth to the transmission between the WTRU and the RS, (where the RS has a better link), than to the transmission between the WTRU and the BS, (where the BS has a worse link), results in a higher rate.

Similarly, Equation (44) implies that assigning a certain amount of bandwidth to the transmission between the WTRU and the BS results in higher rate than assigning no bandwidth to this transmission; assigning more bandwidth to the transmission with better link quality, (the RS-BS link), than the one with worse link quality (the WTRU-BS link).

Cooperative Relaying with Adaptive FDMA

Figure 11:
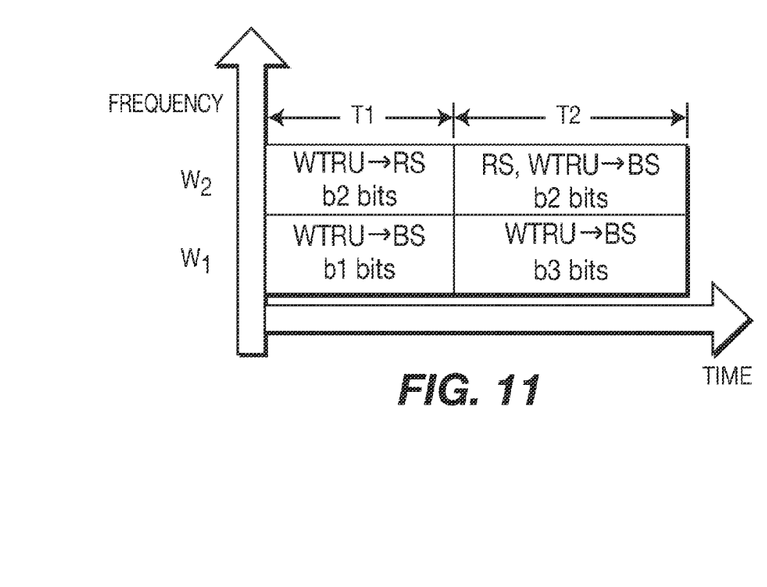
FIG. 11 shows cooperative relaying with adaptive FDMA.

In phase 2, this scheme enables the RS and the WTRU to cooperatively transmit b2 information bits which are received by the RS using cooperative diversity technology, for example, coherent cooperative diversity with the channel state information available at the transmitters or Alamouti's STBC cooperative diversity. An example of this is shown in FIG. 11.

Simple Cooperative Multiplexing with Adaptive FDMA

In phase 2, this scheme enables the RS and the WTRU to act as 2×1 MISO channels. The RS and the WTRU transmit independent information bits; the total number of the information bits they transmit is b2. An example of this is shown in FIG. 12.

Split Cooperative Multiplexing with Adaptive FDMA

Figure 13:
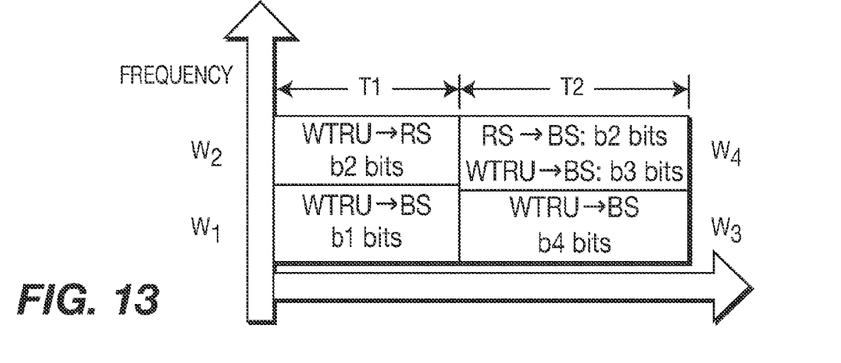
FIG. 13 shows split cooperative multiplexing with adaptive FDMA.

In phase 2, the RS and the WTRU act like distributed 2×1 MIMO, and transmit independent information bits to the BS in $W_2'$. The RS transmits the information bits, b2, which were received in phase 1 by the BS. Meanwhile, the WTRU sends new information bits, b3, to the BS in $W_2'$. In $W_1'$, the WTRU pushes another set of independent information bits, b4, to the BS. Therefore, the total number of information bits received by the BS in phase 1 and phase 2 is b1+b2+b3+b4. An example of this is shown in FIG. 13.

Cell-edge WTRUs are considered in this section. Rates between cell-edge WTRUs and RSs or BSs are formulated as:

$$R_{WTRU-BS} = \rho W_1 \log_2(1 + SINR_{WTRU-BS}) \qquad \text{Equation (45)}$$

$$= \rho W_1 \log_2\left(1 + \frac{SNR_{WTRU-BS}}{\rho + f_\rho SNR_{WTRU-BS}}\right) \text{bits}/s,$$

and $$R_{WRTU-RS} = \rho W_2 \log_2(1 + SINR_{WTRU-BS}) \qquad \text{Equation (46)}$$

$$= \rho W_2 \log_2\left(1 + \frac{SNR_{WTRU-RS}}{\rho + f_\rho SNR_{WTRU-RS}}\right) \text{bits}/s,$$

where $\rho$ represents the re-use factor, $f_\rho$ refers to ICI fraction of the received SNR at the cell-edge WTRUs, $f_\rho = 6(\rho/4)^{\alpha/2}$ stands for the hexagonal planar cellular system, SNR is the received power at the receiver.

As the RS is closer to the BS than the WTRU, the ICI which occurs in the communication between the RS and the BS is much smaller than the ICI which occurs in the communication between the WTRU and the BS. To simplify the analysis, it is assumed that the RS does not experience ICI in its communication to the BS. Therefore:

$$R_{RS-BS} = \rho W_2' \log_2(1 + SINR_{RS-BS}) \qquad \text{Equation (47)}$$

$$= \rho W_2' \log_2\left(1 + \frac{SNR_{RS-BS}}{\rho}\right) \text{bits}/s.$$

Simulation parameters used for the LTE UL system-level are used above. Path loss and penetration loss is assumed without considering shadowing fading. No instantaneous fading is assumed. The following Table 1 shows simulation assumptions for UL communication.

TABLE 1

| Parameter | Assumption |
|---|---|
| Cellular Radius | 1732/3 m (1732 m Inter-cell Distance) |
| Distance-dependent path loss | L = I + 37.6log$_{10}$(.R), R in kilometers I = 128.1 − 2 GHz |
| Penetration Loss | 20 dB |
| Spectrum allocation | 10 MHz |
| Maximum WTRU TX power | 24 dBm |
| Noise Figure | 5 dB |
| Reuse factor (ρ) | 1 and 3 |

Channel Coded Space-Time Codes Design for Cooperative Relaying Systems

There may be two phases of communication in a cooperative relaying system. In phase 1, the RS listens to the WTRU and successfully receives b information bits. In phase 2, the RS and WTRU cooperatively transmit these b information bits to the destination using, for example, Alamouti codes, or other space-time codes. Before the information bits are mapped into the Alamouti transmitter, two parallel channel encoders may be used to encode the information bits.

Figure 14:
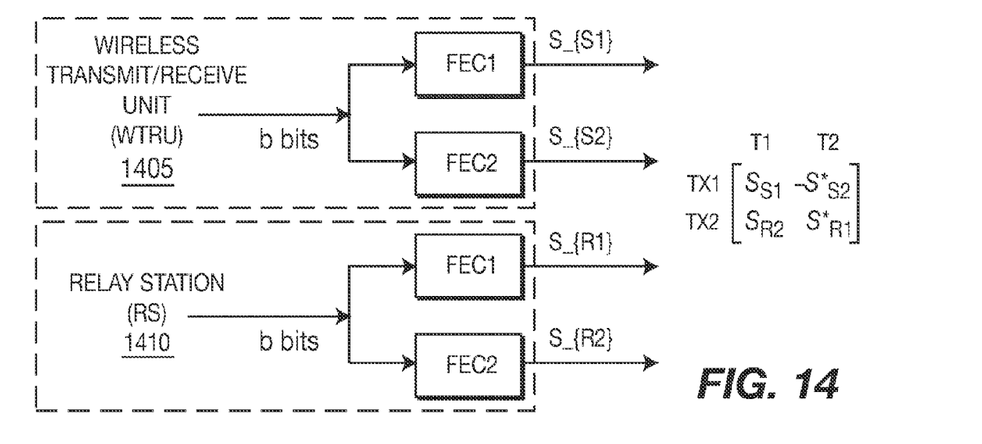
FIG. 14 shows forward error correction (FEC) encoders for cooperative relaying communications.

FIG. 14 shows wireless communication apparatus for encoding including a WTRU 1405 and an RS 1410. In both the WTRU 1405 and the RS 1410, the same information bits may be fed into two parallel forward error correction (FEC) encoders, (i.e., FEC1 and FEC2) that each use a different encoding scheme. Then, the coded bits coming from the FEC encoders are modulated and mapped to a signaling transport converter (STC).

If binary phase shift keying (BPSK) modulation is assumed, then at time slot 1, the WTRU transmits S_{S1}, which is the output of FEC encoder 1 and the RS transmits S_{R2}, which is the output of FEC encoder 2. At the next time slot, the WTRU transmits −conj(S_{S2}), where S_{S2} represents the output of FEC encoder 2 and S_{S2}=S_{R2}, and the RS transmits conj(S_{R1}), where S_{R1} is the output of FEC encoder 1 and S_{R1}=S_{S1}. The STC mapping is given in following Equation (48) with the assumption of BPSK modulation:

$$\begin{array}{c} & T1 & T2 \\ TX1 & \begin{bmatrix} S_{S1} & -S_{S2}^* \\ S_{R2} & S_{R1}^* \end{bmatrix} \end{array} \qquad \text{Equation (48)}$$

Thus, referring to FIG. 14, the WTRU 1405 includes a first FEC encoder that encodes a plurality of data bits using a first encoding scheme, and a second FEC encoder that encodes the plurality of data bits using a second encoding scheme. The RS 1410 includes a third FEC encoder that encodes the plurality of data bits using the first encoding scheme, and a fourth FEC encoder that encodes the plurality of data bits using the second encoding scheme. The first FEC encoder and the fourth FEC encoder may transmit encoded bits during a first time slot, and the second FEC encoder and the third FEC encoder may transmit encoded bits during a second time slot.

One skilled in the art would recognize that this can be easily extended to any other modulation mode. Furthermore, in the wireless communication apparatus of FIG. 14, the WTRU 1405 is used for UL communication. Alternatively, a BS having the same configuration as shown for the WTRU 1405 could be used for DL communication.

Some potential advantages of these schemes over single FEC encoder with Alamouti mapping schemes include that additional channel coding, (redundant version), gain may be achieved in addition to diversity gain provided by space-time codes, if the same coding rate of the FEC coders are used as the one used in the Alamouti scheme. To keep the same channel coding rate as in the Alamouti scheme, the coding rate of FEC1 and FEC2 can be reduced to half the one in the Alamouti scheme. Therefore, the complexity of the FEC encoder used in this new scheme becomes less. There is no extra complexity at the receiver, (the WTRU or the BS).

Figure 15:
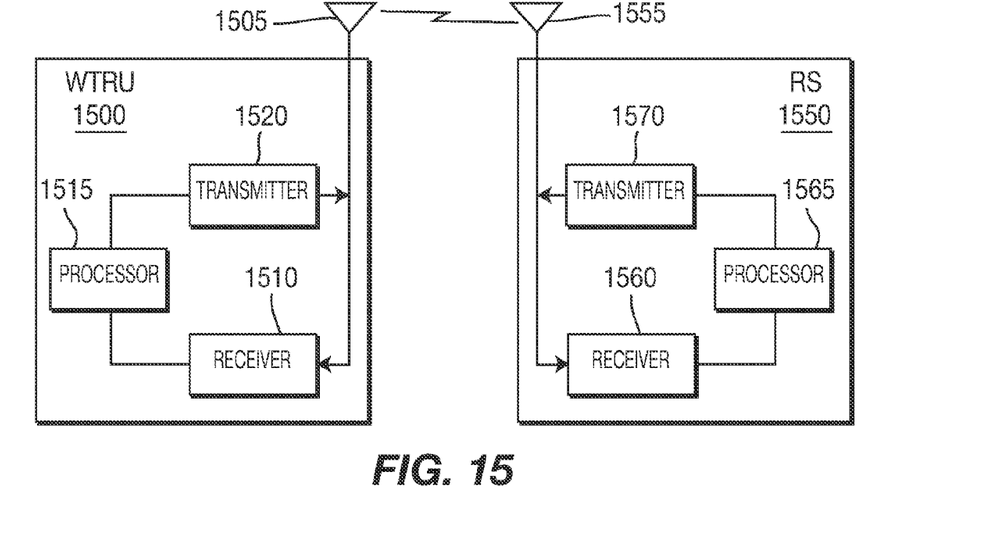
FIG. 15 shows a WTRU communicating with an RS.

FIG. 15 shows a WTRU 1500 communicating with an RS 1550. The WTRU 1500 includes an antenna 1505, (e.g., a MIMO antenna), a receiver 1510, a processor 1515 and a transmitter 1520. The RS 1550 includes an antenna 1555, (e.g., a MIMO antenna), a receiver 1560, a processor 1565 and a transmitter 1570.

Figure 16:
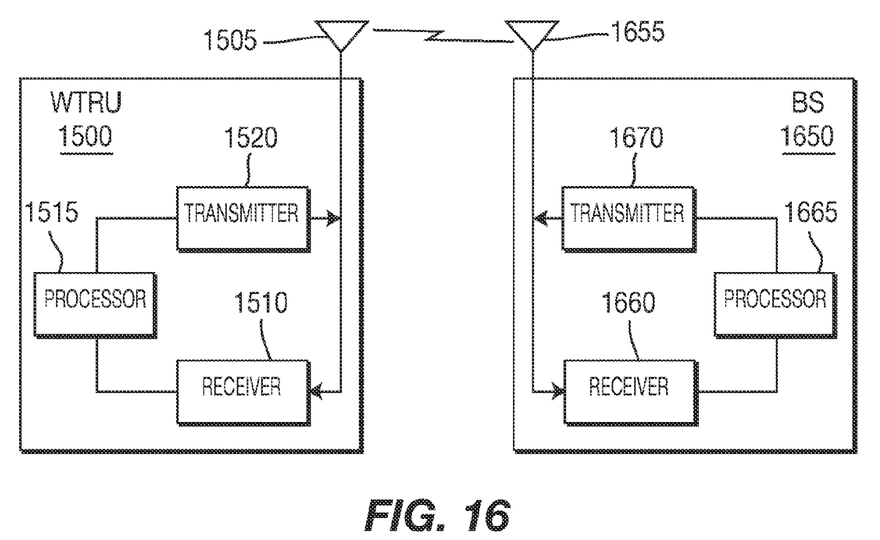
FIG. 16 shows a WTRU communicating with a BS.

FIG. 16 shows the WTRU 1500 communicating with a BS 1650. The BS 1650 includes an antenna 1655, (e.g., a MIMO antenna), a receiver 1660, a processor 1665 and a transmitter 1670.

Figure 17:
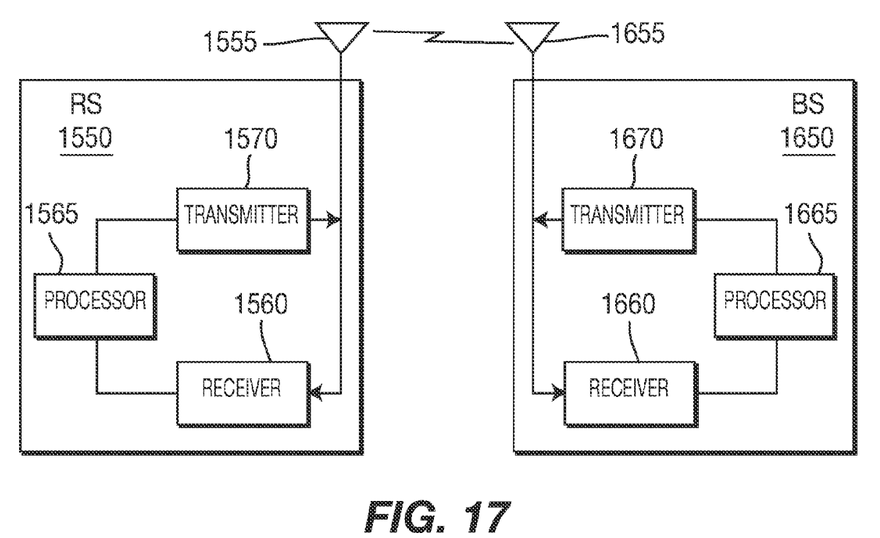
FIG. 17 shows an RS communicating with a BS.

FIG. 17 shows the RS 1550 communicating with the BS 1650.

Referring to FIGS. 15-17, different time periods may be assigned to perform data transmissions over designated frequency bands. A first time period may be assigned for the transmitter 1520 in the WTRU 1500 to transmit data to the RS 1550 over a first frequency band, as shown in FIG. 15, and for the transmitter 1520 in the WTRU 1500 to transmit data to the BS 1650 over a second frequency band, as shown in FIG. 16.

A second time period may be assigned for the transmitter 1570 in the RS 1550 to transmit data to the BS 1650 over the first and second frequency bands, as shown in FIG. 17.

Alternatively, the second time period may be assigned for both of the RS 1550 and the WTRU 1500 to transmit data to the BS 1650 over the first and second frequency bands, as shown in FIGS. 16 and 17.

Alternatively, the second time period may be assigned for the RS 1550 to transmit data to the BS 1650 over the first frequency band, as shown in FIG. 17, and for the WTRU 1500 to transmit data to the BS 1650 over the second frequency band, as shown in FIG. 16.

Alternatively, the second time period may be assigned for the RS 1550 and the WTRU 1500 to transmit data to the BS 1650 over the first frequency band, and for the WTRU 1500 to transmit data to the BS 1650 over the second frequency band, as shown in FIGS. 16 and 17.

Alternatively, the second time period may be assigned for the RS 1550 and the WTRU 1500 to transmit data to the BS 1650 over a third frequency band, and for the WTRU 1500 to transmit data to the BS 1650 over a fourth frequency band, as shown in FIGS. 16 and 17.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of transmitting information bits, the method comprising:
    a wireless transmit/receive unit (WTRU) transmitting a set of information bits of a message to a relay station (RS) over a first frequency band;
    the WTRU transmitting a first portion of the information bits in the set to a base station (BS) over a second frequency band;
    the WTRU receiving an acknowledgement message from the RS indicating successful receipt of the set of information bits;
    the WTRU ceasing transmission of the set of information bits to the RS over the first frequency band in response to receiving the acknowledgement message, while continuing to transmit the first portion of the information bits to the BS over the second frequency band;
    on a condition that the RS fully decodes the message, the RS transmitting a second portion of the information bits in the set to the BS over the first and second frequency bands; and
    the BS recovering the message.

2. A method of transmitting information bits, the method comprising:
    a wireless transmit/receive unit (WTRU) transmitting a set of information bits of a message to a relay station (RS) over a first frequency band;
    the WTRU transmitting a first portion of the information bits in the set to a base station (BS) over a second frequency band;
    the WTRU receiving an acknowledgement message from the RS indicating successful receipt of the set of information bits;
    the WTRU ceasing transmission of the set of information bits to the RS over the first frequency band in response to receiving the acknowledgement message, while continuing to transmit the first portion of the information bits to the BS over the second frequency band;
    on a condition that the RS fully decodes the message, the RS and the WTRU coordinately transmitting a second portion of the information bits in the set to the BS over the first and second frequency bands; and
    the BS recovering the message.

3. Wireless communication apparatus comprising:
    a wireless transmit/receive unit (WTRU);
    a relay station (RS); and
    a base station (BS) configured to recover a message, wherein the WTRU is configured to transmit a set of information bits of the message to the RS over a first frequency band and to transmit a first portion of the information bits in the set to the BS over a second frequency band, receive an acknowledgement message from the RS indicating successful receipt of the set of information bits, cease transmission of the set of information bits to the RS over the first frequency band in response to receiving the acknowledgement message, while continuing to transmit the first portion of the information bits to the BS over the second frequency band, and the RS is configured to transmit a second portion of the information bits in the set to the BS over the first and second frequency bands on a condition that the RS fully decodes the message.

4. Wireless communication apparatus comprising:
    a wireless transmit/receive unit (WTRU);
    a relay station (RS); and
    a base station (BS) configured to recover a message, wherein the WTRU is configured to transmit a set of information bits of the message to the RS over a first frequency band and to transmit a first portion of the information bits in the set to the BS over a second frequency band, receive an acknowledgement message from the RS indicating successful receipt of the set of information bits, cease transmission of the set of information bits to the RS over the first frequency band in response to receiving the acknowledgement message, while continuing to transmit the first portion of the information bits to the BS over the second frequency band, and the RS and WTRU are configured to transmit a second portion of the information bits in the set to the BS over the first and second frequency bands on a condition that the RS fully decodes the message.

5. Wireless communication apparatus for encoding data, the apparatus comprising:
    a wireless transmit/receive unit (WTRU) including a first forward error correction (FEC) encoder that encodes a plurality of data bits using a first encoding scheme, and a second FEC encoder that encodes the plurality of data bits using a second encoding scheme; and
    a relay station (RS) including a third FEC encoder that encodes the plurality of data bits using the first encoding scheme, and a fourth FEC encoder that encodes the plurality of data bits using the second encoding scheme, wherein the first FEC encoder and the fourth FEC encoder transmit encoded bits during a first time slot, and the second FEC encoder and the third FEC encoder transmit encoded bits during a second time slot.

* * * * *